United States Patent [19]

Feustel et al.

[11] 3,860,258
[45] Jan. 14, 1975

[54] BUMPER SUPPORT AND ENERGY ABSORBING FRAME SYSTEM FOR A MOTOR VEHICLE

[75] Inventors: James R. Feustel, Taylor; Kenneth L. Hoyt, Farmington; Jonas Valukonis, Detroit, all of Mich.

[73] Assignee: Ford Motor Company, Dearborn, Mich.

[22] Filed: Oct. 5, 1972

[21] Appl. No.: 295,380

[52] U.S. Cl. ............. 280/106 R, 180/82 R, 180/91, 293/60
[51] Int. Cl. ............................................. B62d 21/02
[58] Field of Search ..................... 280/106 R, 106 T; 296/35 B; 293/60, 63; 180/64 R, 64 L, 82 R, 91; 267/136, 182; 248/358 R

[56] References Cited
UNITED STATES PATENTS

| | | | |
|---|---|---|---|
| 2,517,860 | 8/1950 | Forgy | 180/91 |
| 3,437,367 | 4/1969 | Blank | 293/60 |
| 3,495,474 | 2/1970 | Nishimura et al. | 180/82 R |
| 3,729,221 | 4/1973 | Granig | 293/60 |

*Primary Examiner*—David Schonberg
*Assistant Examiner*—John A. Carroll
*Attorney, Agent, or Firm*—Clifford L. Sadler; Keith L. Zerschling

[57] ABSTRACT

This disclosure relates to impact absorbing systems for motor vehicles. In a preferred embodiment, the system includes energy absorbing frame structure and telescopic energy absorbers supporting the vehicle bumper and disposed within the frame front side rails. The frame side rails have corrugated plastically deformable portions. The telescopic energy absorbers function to absorb low level impact loads against the bumper and to support the corrugated frame portions for controlled collapse during high level impact loads.

10 Claims, 13 Drawing Figures

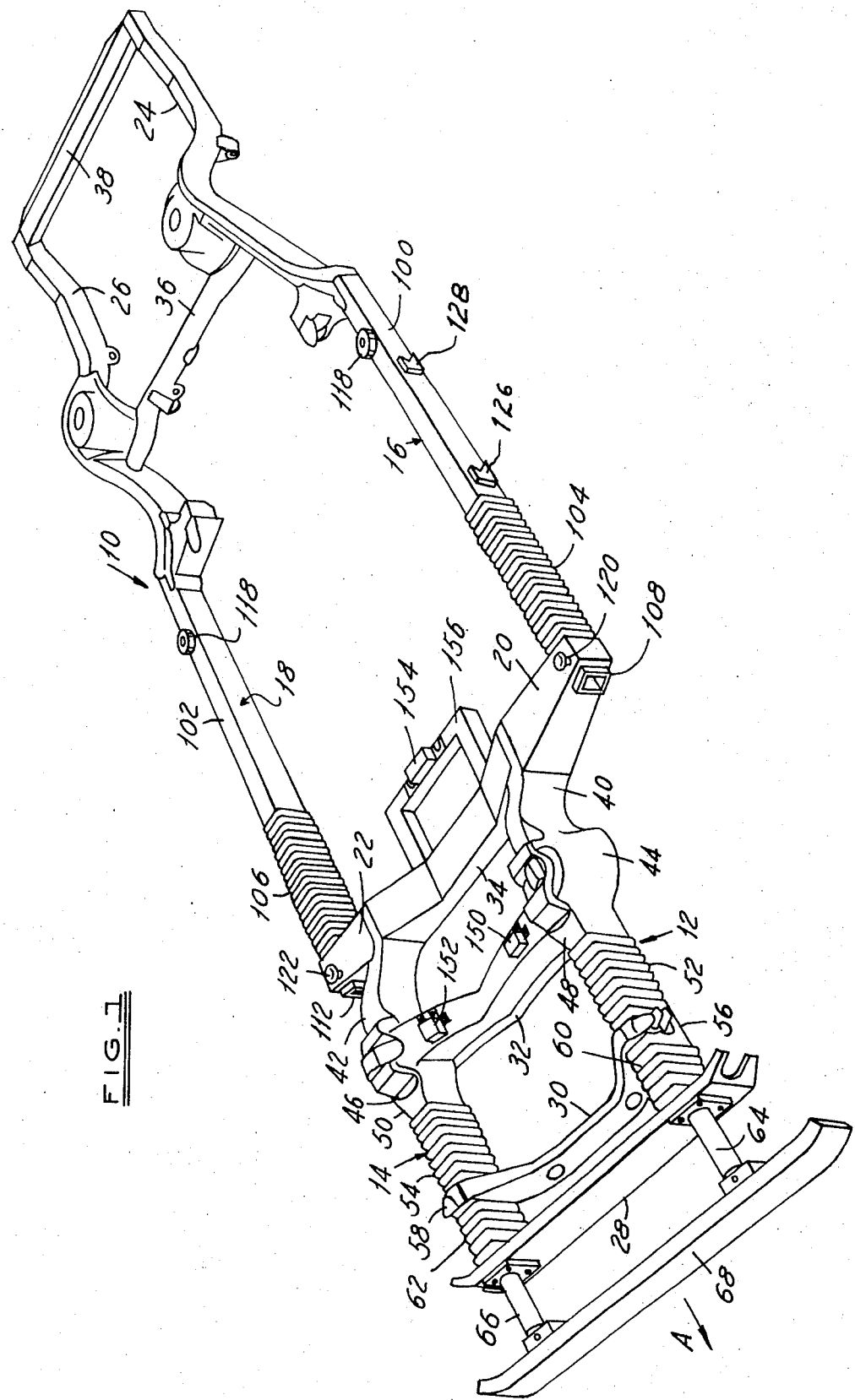

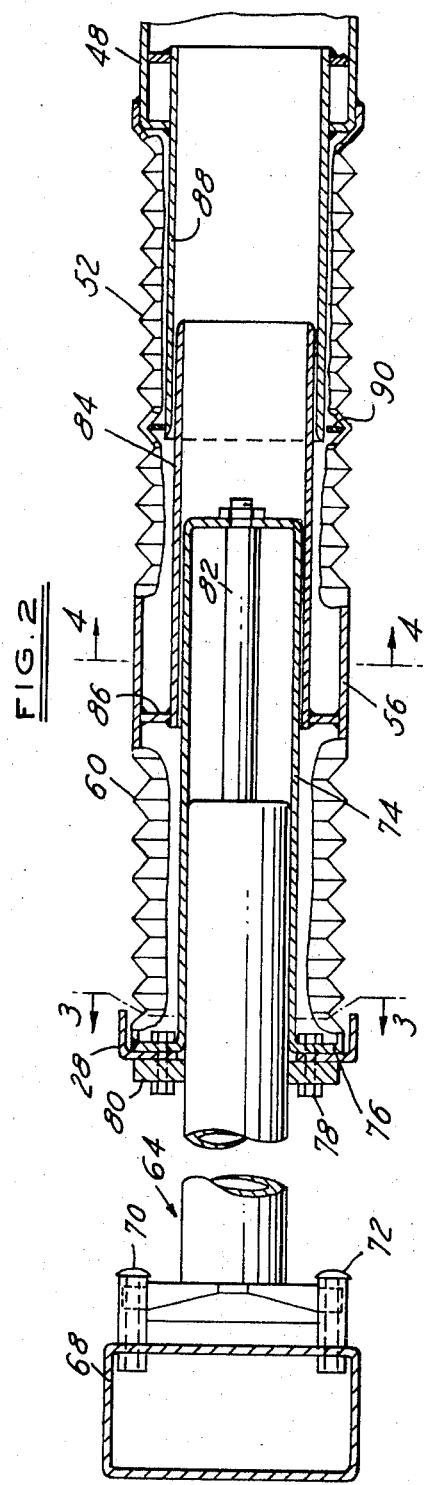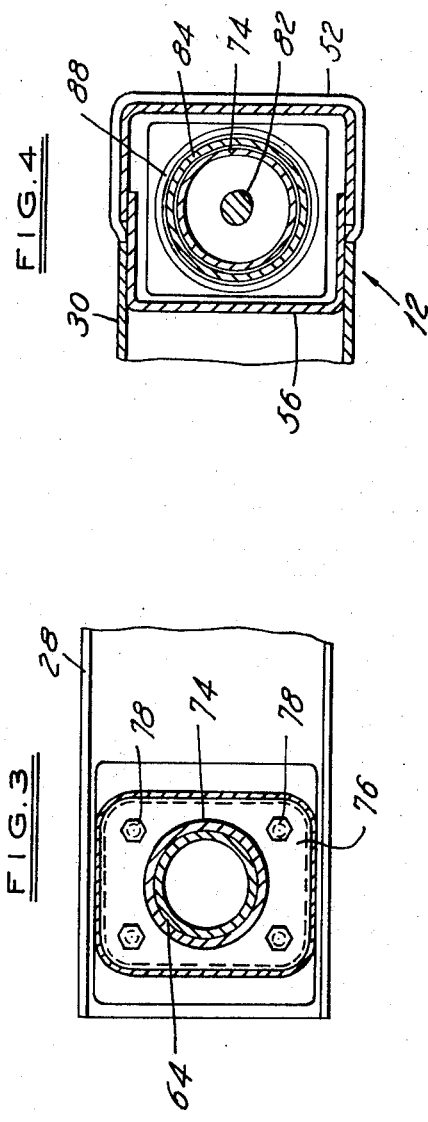

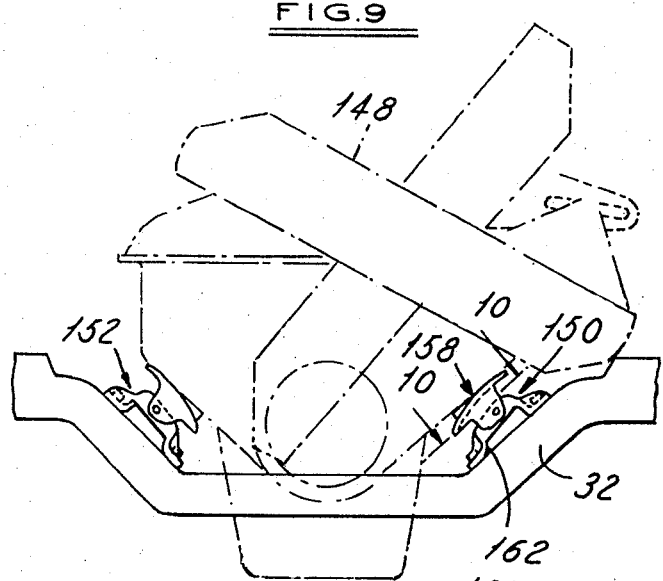
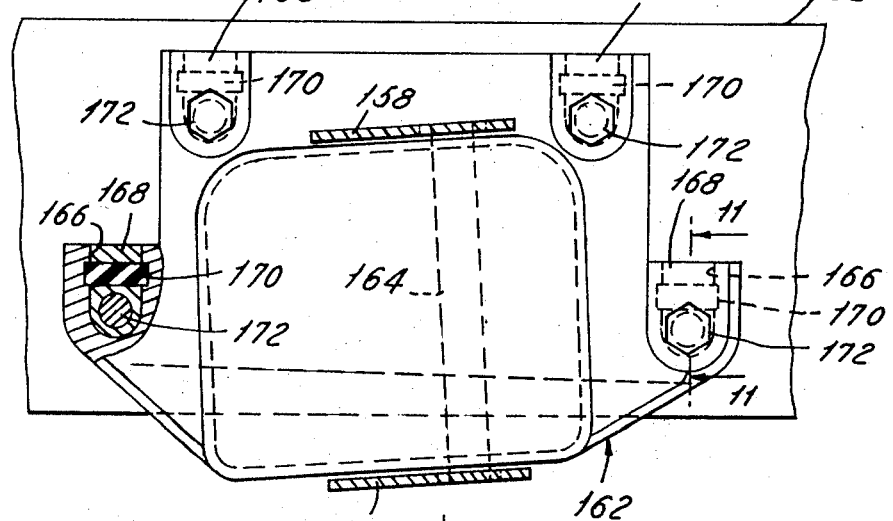
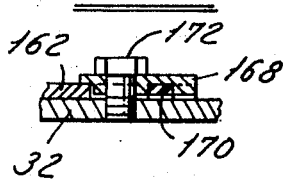

BUMPER SUPPORT AND ENERGY ABSORBING FRAME SYSTEM FOR A MOTOR VEHICLE

BACKGROUND OF THE DISCLOSURE

The present invention is directed to energy absorbing motor vehicle constructions, and more particularly to an energy absorbing frame and bumper support system. The system provides a frame that supports the vehicle body in a normal manner under oridinary loads. The system also includes energy absorbing bumper supports and collapsible frame portions that cooperate to absorb the energy of low and high level impact loads in a controlled fashion.

SUMMARY OF THE DISCLOSURE

In accordance with the presently preferred embodiment of this invention, a vehicle frame has left and right front side rails with corrugated energy absorbing sections. A pari of telescopic hydraulic shock absorbers are situated within the frame side rails and support the bumper bar.

A pair of telescopic guide tubes are situated in each of the energy absorbing frame sections. Each of the telescopic hydraulic shock absorbers has a support tube secured to the forward end of a frame side rail and extending rearwardly into telescopic relationship with the pair of guide tubes located therein.

The hydraulic shock absorbers support a vehicle bumper bar at a spaced distance in front of the vehicle frame. During a low level impact load, the hydraulic shock absorbers telescope to absorb the load. Adequate spacing is provided between the bumper bar and the frame to prevent permanent deformation of the frame or of the body supported thereon during such low level impact. Under a high level impact load, the body portions of the telescopic shock absorbers are displaced rearwardly into the interior of the frame side rails and the corrugated frame sections collapse to absorb the impact energy.

The support tube portions of the shock absorbers, in cooperation with the pair of guide tubes of each side rail, support the rails against lateral buckling so that they will collapse in a controlled linear manner under a major impact load.

BRIEF DESCRIPTION OF THE DRAWINGS

The many objects and advantages of an energy absorbing system for a motor vehicle constructed in accordance with the present invention will become apparent upon consideration of the following detailed description and the accompanying drawings, in which:

FIG. 1 is a perspective view of a preferred form of an energy absorbing vehicle frame assembly;

FIG. 2 is a side elevational view, partly in section, of the left energy absorbing forward side rail and bumper support of the frame assembly of FIG. 1;

FIG. 3 is a sectional view of the left forward frame side rail taken along section line 3—3 of FIG. 2;

FIG. 4 is another sectional view of the left forward frame side rail taken along section line 4—4 of FIG. 2;

FIG. 9 is a front elevational view of the frame, the engine and the engine support system;

FIG. 10 is a sectional view of the left front engine support taken along section line 10—10 of FIG. 9;

FIG. 11 is a sectional view of the break-away bracket fastener taken along section line 11—11 of FIG. 10;

DETAILED DESCRIPTION OF THE PREFERRED EMBODIMENT

Figure 8:
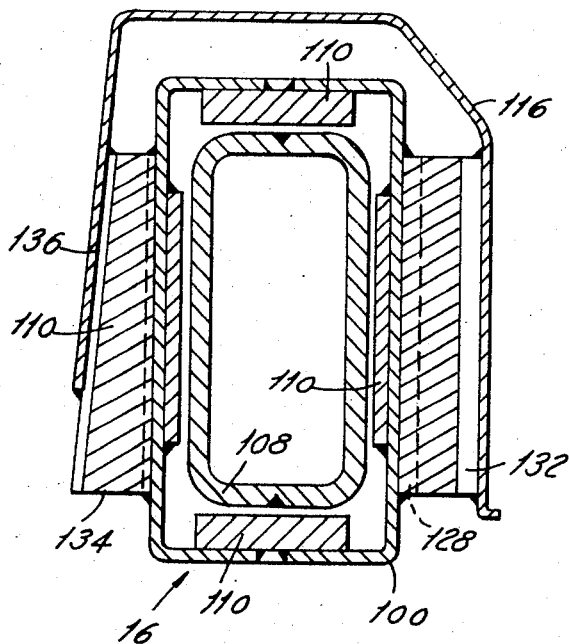
FIG. 8 is a sectional view taken along section line 8—8 of FIG. 5.

Referring now to the drawings, wherein the presently preferred embodiment of this invention is illustrated, FIG. 1 discloses a motor vehicle frame assembly 10 having frame side rails with a plurality of plastically deformable energy absorbing sections. The drawings disclose an energy absorbing system for a motor vehicle that includes an energy absorbing frame, a bumper support system, a dual body support system and an engine mounting system.

THE FRAME ASSEMBLY

The frame assembly 10 includes left and right forward side rail sections 12 and 14. Left and right intermediate side rails 16 and 18 are connected to the left and right forward side rails 12 and 14 by left and right torque boxes 20 and 22. Rearward side rails 24 and 26 have forward ends that are splayed outwardly and joined to the rear ends of the intermediate side rails 16 and 18.

The forward frame side rails 12 and 14 are interconnected by frame cross members 28, 30 and 32. The torque boxes 20 and 22 are interconnected by a frame cross member 34. The rear side rails 24 and 26 are interconnected by frame cross members 36 and 38.

The forward frame side rails 12 and 14 are constructed to receive the suspension springs and the suspension arms of the suspension system for the vehicle's front wheels. Similarly, the rear side rails 24 and 26 are adapted to receive the rear coil springs and the suspension arms which are connected to the rear axle.

In addition to supporting the suspension components, vehicle body, engine and driveline during normal vehicle operation, the frame assembly 10 performs an energy absorbing function in the event an impact load is imposed upon it.

Forward Frame Structure

The forward frame structure includes frame portions 40 and 42 which extend forwardly from the torque boxes 20 and 22. The frame portions 40 and 42 are provided with bell-shape portions 44 and 46 that are constructed to receive the coil springs of the front suspension system. The frame cross member 32 interconnects the spring supports 44 and 46. The upper suspension arms are pivotally connected to the upper side of the bell-shape spring supports 44 and 46. Short, straight frame portions 48 and 50 extend forwardly from the bell-shape portions 44 and 46. Each of the frame portions 48, 50 has a box-shape in cross section.

Corrugated energy absorbing frame sections 52 and 54 extend forwardly from the frame portions 48 and 50. The forward end of the corrugated sections 52 and 54 are connected to short reinforced box-sections rail portions 56 and 58. The frame cross member 30 has its outer ends connected to the reinforced box-sections 56 and 58. Forward corrugated box-section members 60 and 62 are interposed between the reinforced sections 56 and 58 and the outer ends of the frame cross member 28.

Each of the energy absorbing frame portions 52, 54, 60 and 62 has a hollow box shape in cross section. Each side of the box is formed of corrugated sheet metal and is constructed to collapse or crush at a controlled rate when subjected to an impact load that exceeds predetermined minimum value.

THE BUMPER SUPPORT SYSTEM AND FRAME STRUCTURE

A pair of hydraulic telescopic shock absorbers 64 and 66 are provided to support a bumper bar 68. The shock absorbers 64 and 66 are supported within the interior of the left and right energy absorbing frame sections 52, 60 and 54, 62, respectively. The bar 68 is spaced forwardly of the first frame cross member 28 by an adequate amount to accommodate bumper defection under an impact load.

Referring to FIG. 2, wherein the construction of the left side rail 12 is shown in greater detail, the bumper bar 68 is bolted to the left telescopic shock absorber 64 by threaded fasteners 70 and 72.

The absorber 64 includes a support tube 74 disposed within the energy absorbing frame portion 60. The support tube 74 has a flanged forward end 76 that is bolted to the frame cross member 28 by a series of bolts 78. The bolts 78 pass through the flange 76, the cross member 28 and a reinforcing plate 80. The support tube 74 extends rearwardly from the cross member 28 through the interior of the energy absorbing frame portion 60 and the reinforced frame portion 56. A piston rod 82 protrudes from the rearward end of the body of the shock absorber 64 and is secured to the closed end of the absorber support tube 74.

A first guide tube 84 surrounds the absorber support tube 74. The forward end of the guide tube 84 is welded to the structure of the reinforced frame section 56 as shown at 86.

The first guide tube 84 extends rearwardly from the reinforced frame section 56 into the forward end of a second guide tube 88. A support ring 90 positions the forward end of the second tube 88 within the energy absorbing section 52 of the forward left side rail assembly 12. The rearward end of the second guide tube 88 is welded to the frame portion 48.

FIGS. 2, 3 and 4 disclose the details of the construction of the forward left side rail and the associated energy absorbing components. The right forward side rail 14 is similarly constructed and arranged.

This structure provides a means for absorbing minor impacts against the bumper bar and controlled collapse of the forward rail members under a major impact load.

The Body Support System and Frame Structure

The mid frame structure of the frame assembly 10 of FIG. 1 includes energy absorbing means and a primary and secondary body support system.

Referring to FIGS. 1 and 5 through 8, the side rails 16 and 18 include rigid rearward straight portions 100 and 102 that have their rearward ends connected to the rear side rails 24 and 26. The forward end of the side rail portions 100 and 102 are welded to left and right energy absorbing frame sections 104 and 106, respectively. The energy absorbing left and right frame sections 104 and 106 interconnect portions 100 and 102 of side rails 16 and 18 with the torque boxes 20 and 22. Each of the energy absorbing sections 102 and 104 has a hollow box shape in cross sectional view. Each side of the box is formed of corrugated sheet metal that is designed to collapse or crush at a controlled rate for energy absorption when subjected to an impact load above a predetermined minimum value.

Figure 6:
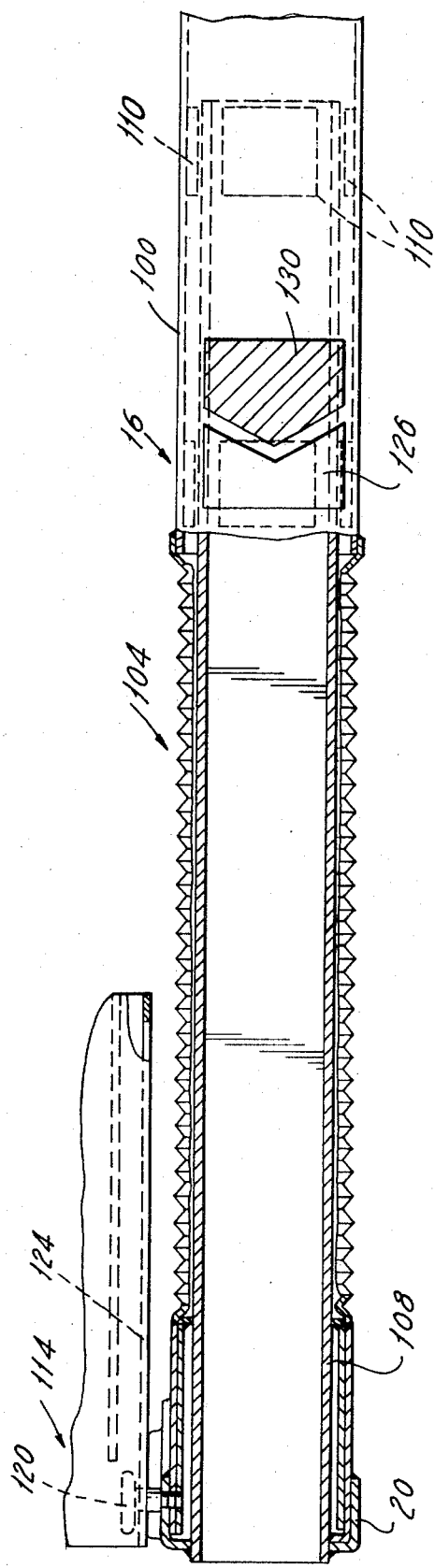
FIG. 6 is a side elevational view, partly in section, of the frame and body structure of FIG. 5.

Referring to FIG. 6, the left intermediate side rail 16 includes a box section guide tube 108 that is fitted within the energy absorbing frame section 104 and has its forward end welded to the left torque box 20. The rear end of the guide tube 108 extends into the interior of the straight side rail portion 100. As seen in FIGS. 6 and 8, plates 110 are provided on the interior of the rail portion 104 to support the rearward end of the guide tube 108 and prevent its rattling during normal vehicle operation.

The right side rail 18 includes, as part of its assembly, a similarly constructed and arranged guide tube 112 that has its forward end welded to the torque box 22. The guide tube 112 extends rearwardly through the interior of the energy absorbing rail section 106 into the straight rail section 102.

Primary and secondary means are provided for supporting the vehicle body upon the intermediate side rails 16 and 18. The vehicle body 114 inclues a sill portion 116 adapted to fit over the side rail 16. The vehicle body 114 is supported on the frame 10 by a primary support system which incudes a plurality of rubber mounts such as the rubber pucks 118 and that are interposed between the frame side rails 16 and 18 and the side sills of the vehicle body. The rubber mounts normally function to limit the transmission of objectionable noise and vibration to the body.

The secondary body support system becomes operational in the event an impact load is exerted against the front of the frame assembly 10. The secondary body support system includes left and right T-bolts 120 and 122. The bolts 120, 122 are secured to the left and right torque boxes 20 and 22 and have their heads spaced upwardly from the upper surface of the torque boxes.

Figure 7:
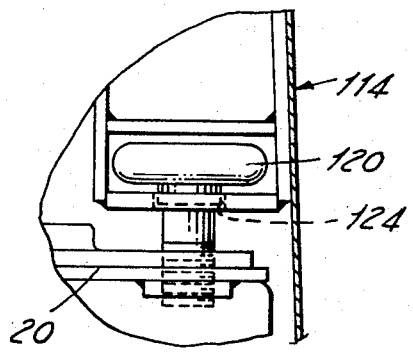
FIG. 7 is a front elevational view of a T-bolt which interconnects the body and frame and which forms a part of the secondary body support system of FIG. 5.
Figure 5:
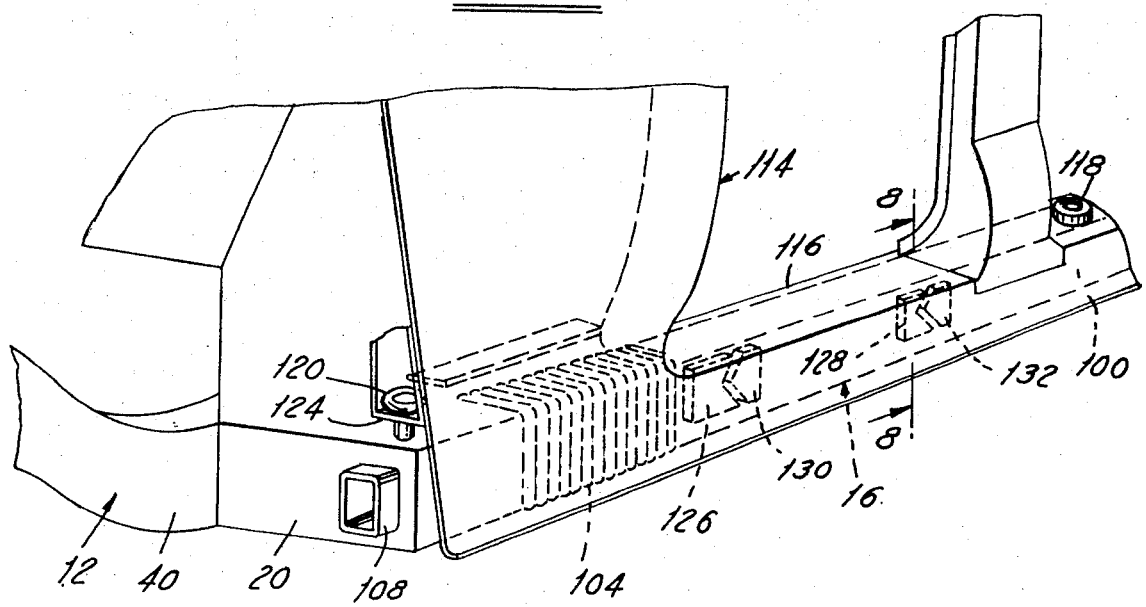
FIG. 5 is a perspective view of the left intermediate side rail portion of the frame assembly, a portion of the vehicle body and the body mounting system.

A longitudinally extending guide slot 124 is provided in the forward structure of the body 114 (see FIGS. 5, 6 and 7). The slot 124 is provided in a plate of the sill structure to trap the head of the T-bolt 120. The engagement between the T-bolt 120 and the guide slot 124 of the body structure 114 permits axial displacment of the torque box 20 with respect to the body 114 while preventing upward displacement of the body.

The secondary body support system also incudes a pair of longitudinally spaced V-blocks 126 and 128 that are welded to the side of the frame side rail portion 100. The blocks 126 and 128 have rearwardly opening V-shape surfaces. Complementary V-blocks 130 and 132 are welded to the inner sides of the body side sill 116. The blocks 130 and 132 have forwardly pointed V-shape surfaces that are normally longitudinally spaced a short distance from the adjacent surfaces of the frame mounted V-blocks 126 and 128. As seen in FIG. 8, a similar arrangement of blocks is provided on the inner side of the frame portion 100. A block 134, welded to the inner side of the rail portion 100, has a rearwardly opening V-shape surface that is longitudinally spaced a short distance from a V-block 136 welded to the inner surface of the body side sill 116.

The bolts and the interengagement of the several body and frame mounted V-blocks provide a secondary body support system that is effective during a major impact as will be described.

The Engine Mounting System

One-way support means is provided for the vehicle engine 148. Referring now to FIG. 1 and FIGS. 9 to 13, an engine support system is shown that permits the vehicle's power plant 148 to operate in a normal fashion under normal circumstances but which permits the engine to be displaced forwardly with respect to the frame 10 in the event an impact load is exerted upon the frame that exceeds a predetermined minimum value.

The engine support system includes a pair of forward engine mount assemblies 150 and 152 which are connected to the frame cross member 32 and a rear engine mount assembly 154 that is supported on a U-shape cantilever frame member 156 extending rearwardly from the frame cross member 34.

FIGS. 10 and 11 disclose the construction of the left engine mount 150. The right mount 152 is similarly constructed. The left engine mount 150 includes a first bracket 158 that is secured to the vehicle engine 148 and a second bracket 162 that is secured to the frame cross member 32. The brackets 158 and 162 are connected by a single bolt 164 which is shown in phantom in FIG. 10.

The bracket 162 is secured to the frame cross member 32 by four break-away supports or fastener assemblies. Each fastener or support includes an open-ended slot 166 formed in the bracket 162. A metal piece 168 is fitted in the slot and locked in position by a shearable member 170. A bolt 172 passes through the metal piece 168 supporting the shearable member 170 to clamp the bracket 162 to the frame cross member 32.

During normal operation, the bracket 162 will be secured to the frame member 32 by the four bolts 172. In the event a major impact load is exerted against the front of the frame assembly 10, the inertia load of the engine 148 upon the engine bracket 162 will cause the shearable members 170 to fracture. The bracket 162 will then be free to slide forwardly with respect to the frame member 32 and the metal piece 168 normally seated in the U-shape slot 166. Fracture of the frangible member 170 releases the engine 148 to move forwardly (in the direction of arrow A) with respect to the frame assembly 10.

The right engine mount 152 is similarly constructed and arranged to that of the left mount 158 shown in FIGS. 10 and 11. Rubber elements may be provided in the engine mounts 150 and 152 to isolate engine noise and vibration from the vehicle frame 10 and body 114.

Figure 13:
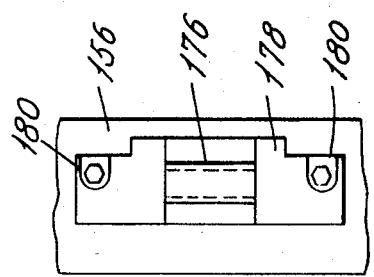
FIG. 13 is a top plan view of the rear engine mount shown in FIG. 12.
Figure 12:
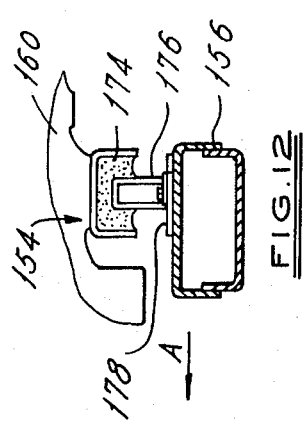
FIG. 12 is a side elevational view of the rear engine mount.

The rear engine mount is also of a break-away construction. Referring to FIGS. 12 and 13, the engine 148 is connected through a rubber block 174 to a bracket 176 supported on a plate 178. The plate 178 is connected to the frame component 156 by a pair of break-away fastener assemblies 180. The fastener assemblies 180 are each identical in construction and operation to the structure shown in FIG. 11 which secures the front engine mounts 150 and 152 to the frame member 32. The fastener assemblies 180 include shearable elements that permit the bracket structure 178 to separate from the frame member 156 and to move forwardly in the direction of arrow A (FIGS. 12 and 13) when a rearwardly directed impact load is exerted upon the forward end of the frame 10.

The slots 166, containing the fastener pieces 168 and frangible elements 170, open rearwardly. In the event a rearwardly directed impact load is directly imposed upon the engine 148, the intermediate fastener pieces 168 will engage the end of the slots 166 and prevent the engine mounts from being displaced rearwardly with respect to the frame assembly 10 and the engine 148 toward the body 114. Thus, the engine mounts do, in fact, constitute one-way break-away mounts.

OPERATION

The foregoing description presents an energy absorbing frame, a bumper support system, primary and secondary body support systems and a break-away engine mounting system. When a rearwardly directed impact load is exerted against the bumper bar 68 of a motor vehicle having the frame assembly 10, the energy absorbing structures and associated systems of this invention will operate in the following manner.

An impact load against the bumper bar 68 that is of a nominal value will cause the body portion of the hydraulic shock absorbers 64 and 66 to telescope rearwardly into the frame side rails 12 and 14. Energy will be absorbed by the reciprocation of the pistons connected to the end of the piston rods 82 through the fluid medium contained within the shock absorber assemblies 64 and 66.

In the event an impact load of substantial magnitude is imposed upon the bumper bar 68, the energy absorbers 64 and 66 will telescope into the side rails 12 and 14 to absorb the initial portion of the load. Assuming that the impact load exceeds the level that can be handled by the absorbers 64 and 66 and, further, that the load exceeds the maximum that the energy absorbing frame sections 52, 54, 60 and 62 of the forward frame rails 12, 14 can support, then these corrugated sections will crush or collapse. Due to the telescopic relationship provided by the energy absorber support tube 74 with respect to the guide tubes 84 and 88, the energy absorbing sections 52 and 60 will crush or collapse in a linear direction rather than buckling outwardly.

Thus, the shock absorbers 64 and 66 serve the dual purpose of absorbing the initial portion of an impact and of supporting the corrugated sections 60 and 62 during collapse. The shock absorbers 64, 66 cooperate with the guide tubes 84 and 88 to control the manner in which the left and right energy absorbing frame sections 52, 60 and 54, 62 collapse.

The vehicle body 114 is normally supported solely on rubber body mounts of the type indicated by reference numeral 118. These rubber mounts serve as a means of isolating road noise and vibration from the vehicle body.

Under a substantial impact load that exceeds a predetermined minimum, the mounts 118 will deflect and the vehicle body 114 will shift forwardly until the body supported V-blocks 130, 132 and 136 come into engagement with the frame supported V blocks 126, 128 and 134. Under these circumstances, the body 114 will become rigid with the frame assembly 10 at a location on the frame assembly rearwardly of the intermediate energy absorbing frame sections 104, 106 and of the forward energy absorbing sections 52, 54, 60 and 62.

Under the effects of a major impact load, the corrugated frame sections 104 and 106 will collapse or crush along an axial line. The collapsing or crushing of these sections will be guided by the guide tubes 108 and 112 which will prevent the corrugated sections 104 and 106 from buckling outwardly.

The corrugated pleats which form the sides of the frame sections 104 and 106 will be plastically deformed uner the impact load and their plastic deformation will absorb the load imposed upon the vehicle frame 10 by the inertia of the body 114.

As the frame sections 104 and 106 collapse, the distance between the torque boxes 20 and 22 and the rear of the frame where the V-shape blocks are secured will shorten. This will cause the T-bolts 120 and 122 to move along the guide slots 124 in the body side sills 116. The T-bolts 120 and 122 in engagement with the body side sills 116 will prevent the body 114 from being displaced upwardly. The T-bolts 120 and 122 will hold the body 114 upon the frame 10 while permitting the corrugated sections 104 and 106 to collapse and absorb the energy of the impact.

The torque boxes 20 and 22 provide a rigid interconneconnection between the forward side rails 12 and 14 and the intermediate side rails 16 and 18. The torque boxes 20 and 22, in association with the frame cross members (such as member 34) assist the linear deformation of the intermediate energy absorbing frame sections 104 and 106. The rigidity provided to the frame assembly 10 by the torque boxes 20 and 22 and the frame cross members prevents a force couple from being imposed on the energy absorbing frame sections 104 and 106 when a major impact strikes the bumper bar 68 that might otherwise cause the sections 104 and 106 to be bowed outwardly.

The disclosed engine mounting system removes the inertia load of the engine 148 from the energy absorbing sections of the frame 10 during a major impact.

In the event an impact load is exerted against the forward end of a moving vehicle having this engine mounting system, the inertia load of the engine 148 will stress the shearable elements 170 in the forward engine mounts 150 and 152 and in the rear mount 154. If the stress levels exceed the predetermined minimum of the several shearable elements 170, the elements 170 will fracture and inertia will cause the engine 148 to separate from the frame components 32 and 156. The engine 148 and its associated drivetrain components will be free to move forwardly with respect to the frame assembly 10. In this event, the several energy absorbing portions of the frame will not have to bear the inertia load of the engine mass.

If the rearwardly directed impact load is directly imposed upon the engine 148, the intermediate metal pieces 168, being in engagement with the end of the slots 166, will prevent the engine mounts and the engine from being displaced rearwardly toward the vehicle body 114.

In accordance with the present invention, and energy absorbing vehicle system is provided having means for absorbing various levels of impact load. Such means includes telescopic shock absorbers for absorbing minor loads exerted against the bumper bar and plastically deformable frame sections constructed to absorb major loads. A dual body mounting system is provided which permits isolation of the vehicle body from the frame under normal conditions and a rigid interconnection under an impact load so that the body may be decelerated at a controlled rate by deformation of energy absorbing frame structure. The vehicle system may include break-away mounts whereby the inertia load of the engine need not be supported by the plastically deformable frame sections.

The foregoing description presents the presently preferred embodiment of this invention. Modifications and alterations may occur to those skilled in the art that will come within the scope and spirit of the following claims.

I claim:

1. An energy absorbing system for a motor vehicle comprising:
   a vehicle frame assembly having longitudinally extending frame rails,
   body mounting means and engine mounting means connected to said frame assembly and constructed to support a vehicle body and a vehicle engine on said frame assembly,
   said rails having portions enclosed on at least three sides,
   energy absorbing bumper supports of elongated construction connected to said frame rails,
   said bumper supports having means extending longitudinally within the three sides of said rail portions and connected to said frame assembly,
   a bumper bar extending transversely of said frame assembly and connected to said energy absorbing bumper supports,
   said energy absorbing bumper supports being linearly deflectable under minor impact loads whereby said minor loads are absorbed,
   said rail portions being linearly plastically deformable under a longitudinally directed major impact load above a predetermined minimum,
   said means of said bumper supports extending within said rail portions and engaging an interior surface of said rail portions and supporting said rail portions against lateral buckling during the linear plastic deformation thereof under said major impact load.

2. An energy absorbing system for a motor vehicle according to claim 1:
   said frame rail portions being of generally enclosed tubular construction.

3. An energy absorbing system for a motor vehicle according to claim 1:
   said frame rail portions having corrugated walls.

4. An energy absorbing system for a motor vehicle according to claim 1:
   said frame rail portions being of generally enclosed tubular construction,
   said frame rail portions having corrugaged walls.

5. An energy absorbing system for a motor vehicle comprising:
   a vehicle frame assembly having longitudinally extending left and right frame side rails,
   said left and right side rails each having plastically deformable portions of generally enclosed tubular construction,
   body mounting means an engine mounting means connected to said frame assembly and constructed to support a vehicle body and a vehicle engine on said frame assembly, left and right energy absorbing bumper supports of generally elongated telescopic construction connected to said frame side rails, said left and right bumper supports having means extending longitudinally into the interior of said left and right frame side rail protions, respectively, a bumper bar extending transversely of said frame assembly and connected to said energy absorbing bumper supports, said energy absorbing bumper supports being telescopically deflectable under minor impact loads whereby said minor loads are absorbed, said side rail portions being linearly plastically deformable under a major impact load above a predetermined minimum value, said means of said left and right energy absorbing bumper supports extending into said side rails and engaging an interior surface of said side rails and supporting said left and right side rail portions during the linear plastic deformation thereof under said major impact load to prevent said rail portions from buckling laterally.

6. An energy absorbing system for a motor vehicle according to claim 5:

said frame rail portions having corrugated walls.

7. An energy absorbing system for a motor vehicle comprising:

a vehicle frame assembly having longitudinally extending left and right frame side rails, said left and right side rails each having plastically deformable portions of generally enclosed tubular construction, left and right energy absorbing bumper supports of generally elongated telescopic construction, said left and right bumper supports extending longitudinally into the interior of said left and right frame side rail portions, respectively, a bumper bar extending transversely of said frame assembly and connected to said energy absorbing bumper supports, said energy absorbing bumper supports being constructed to absorb minor impact loads by telescopic deflection, said side rail portions being deformable under a major impact load above a predetermined minimum value, said left and right energy absorbing bumper supports being constructed to support said left and right side rail portions during the plastic deformation thereof under said major impact load to prevent said rail portions from buckling laterally, said left and right energy absorbing bumper supports each having a body portion and a support tube portion, said body portions of said left and right bumper supports being connected to said bumper bar, said support tube portions of said left and right bumper supports being connected to said frame assembly and disposed within said plastically deformable portions of said left and right side rails.

8. An energy absorbing system for a motor vehicle comprising:

a vehicle frame assembly having longitudinally extending left and right frame side rails, said left and right side rails each having plastically deformable portions of generally enclosed tubular construction, left and right energy absorbing bumper supports of generally elongated telescopic construction, said left and right bumper supports extending longitudinally into the interior of said left and right frame side rail portions, respectively, a bumper bar extending transversely of said frame assembly and connected to said energy absorbing bumper supports, said energy absorbing bumper supports being constructed to absorb minor impact loads by telescopic deflection, said side rail portions being deformable under a major impact load above a predetermined minimum value, said left and right energy absorbing bumper supports being constructed to support said left and right side rail portions during the plastic deformation thereof under said major impact load to prevent said rail portions from buckling laterally, said left and right energy absorbing bumper supports each having a body portion and a support tube portion, said body portions of said left and right bumper supports being connected to said bumper bar, said support tube portions of said left and right bumper supports being connected to said frame assembly and disposed within said plastically deformable portions of said left and right side rails, left and right guide members disposed within said plastically deformable portions of said left and right side rails, respectively, and secured to said frame assembly, said left and right guide members telescopically engaging said support tube portions of said left and right energy absorbing bumper supports, respectively, said support tube portion of said left bumper support cooperating with said left guide member and said support tube portion of said right bumper support cooperating with said right guide member to form left and right guide means constructed to support said plastically deformable portions of said left and right side rails, respectively, during the collapse thereof under said major impact load.

9. An energy absorbing system for a motor vehicle comprising:

a vehicle frame assembly having longitudinally extending left and right frame side rails, said left and right side rails each having plastically deformable portions of generally enclosed tubular construction, left and right energy absorbing bumper supports of generally elongated telescopic construction, said left and right bumper supports extending longitudinally into the interior of said left and right frame side rail portions, respectively, a bumper bar extending transversely of said frame assembly and connected to said energy absorbing bumper supports, said energy absorbing bumper supports being constructed to absorb minor impact loads by telescopic deflection, said side rail portions being deformable under a major impact load above a predetermined minimum value, said left and right energy absorbing bumper supports being constructed to support said left and right side rail portions during the plastic deformation thereof under said major impact load to prevent said rail portions from buckling laterally, said left and right energy absorbing bumper supports each having a body portion and a support tube portion, said body portions of said left and right bumper supports being connected to said bumper bar, said support tube portions of said left and right bumper supports being connected to said frame assembly and disposed within said plastically deformable portions of said left and right side rails, a left pair of telescopic guide members disposed within said plastically deformable portion of said left side rails, a right pair of telescopic guide members disposed within the plastically deformable portion of said right side rail, said left and right pairs of guide members being telescopically disposed with respect to said support tube portions of said left and right bumper supports, respectively, said support tube portion of said left bumper support cooperating with said left pair of guide members and said support tube portion of said right bumper support cooperating with said right pair of guide members to form left and right guide means constructed to support said plastically deformable portions of said left and right side rails, respectively, during the collapse thereof under said major impact load.

10. An energy absorbing system for a motor vehicle comprising:

a vehicle frame assembly having longitudinally extending left and right frame side rails, said left and right side rails each having plastically deformable portions of generally enclosed tubular construction, left and right energy absorbing bumper supports of generally elongated telescopic construction, said left and right bumper supports extending longitudinally into the interior of said left and right frame side rail portions, respectively, a bumper bar extending transversely of said frame assembly and connected to said energy absorbing bumper supports, said energy absorbing bumper supports being constructed to absorb minor impact loads by telescopic deflection, said side rail portions being deformable under a major impact load above a predetermined minimum value, said left and right energy absorbing bumper supports being constructed to support said left and right side rail portions during the plastic deformation thereof under said major impact load to prevent said rail portions form buckling laterally, said left and right energy absorbing bumper supports each having a body portion and a support tube portion, said body portions of said left and right bumper supports being connected to said bumper bar, said support tube portions of said left and right bumper supports being connected to said frame assembly, said left and right frame side rails each having longitudinally space apart fore and aft energy absorbing sections, a left reinforced frame structure interconnecting said longitudinally spaced fore and aft energy absorbing sections of said left frame side rail, a right reinforced frame structure interconnecting said longitudinally spaced for and aft energy absorbing sections of said right frame side rail, a frame cross member interconnecting said left and right reinforced frame structures, left and right first guide members disposed within said fore energy absorbing sections of said left and right side rails and secured to said left and right reinforced frame structures, respectively, said left and right first guide members telescopically engaging said support tube portions of said left and right energy absorbing bumper supports, respectively, left and right second guide members disposed within said aft energy absorbing sections of said left and right side rails and secured to said frame assembly, said left and right second guide members telescopically engaging said left and right first guide members, respectively, said support tube portion of said left bumper support cooperating with said left first and second guide members and said support tube portion of said right bumper support cooperating with said right first and second guide members to form left and right guide means constructed to support said longitudinally spaced fore and aft energy absorbing sections of said left and right frame said rails, respectively, during their collapse under said major impact load to prevent said sections from buckling laterally.

* * * * *